Sept. 27, 1966  P. BERTON  3,274,775
HOT GAS GENERATORS AND IN PARTICULAR ROCKET MOTORS
Filed July 15, 1963  4 Sheets-Sheet 1
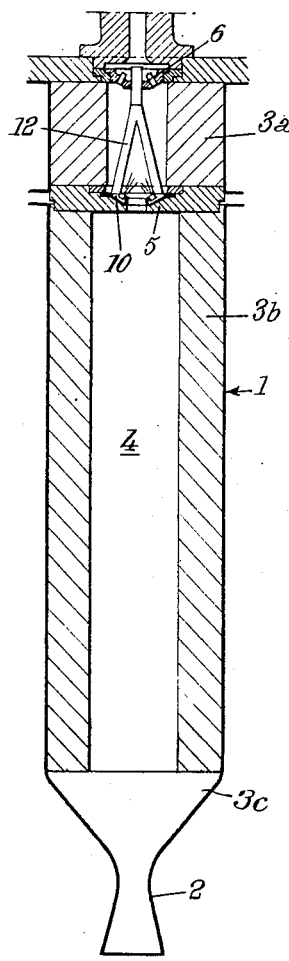
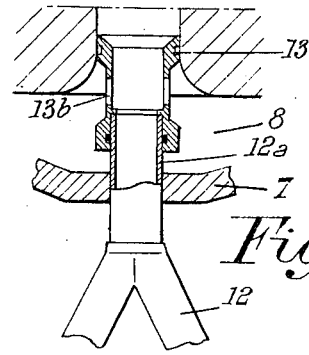
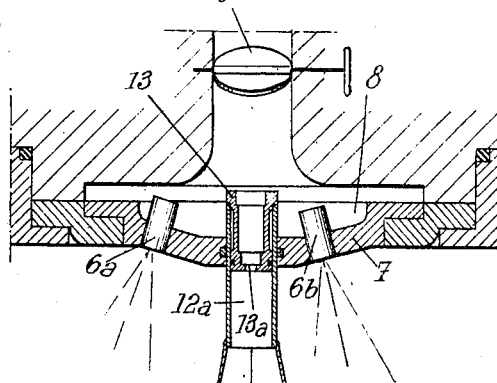
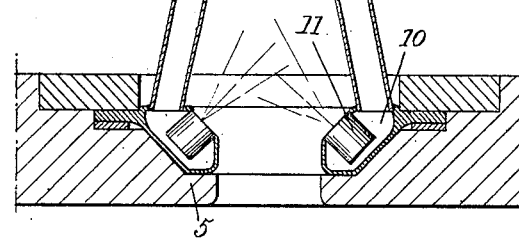

Sept. 27, 1966  P. BERTON  3,274,775
HOT GAS GENERATORS AND IN PARTICULAR ROCKET MOTORS
Filed July 15, 1963  4 Sheets-Sheet 2

Sept. 27, 1966  P. BERTON  3,274,775
HOT GAS GENERATORS AND IN PARTICULAR ROCKET MOTORS
Filed July 15, 1963  4 Sheets-Sheet 3

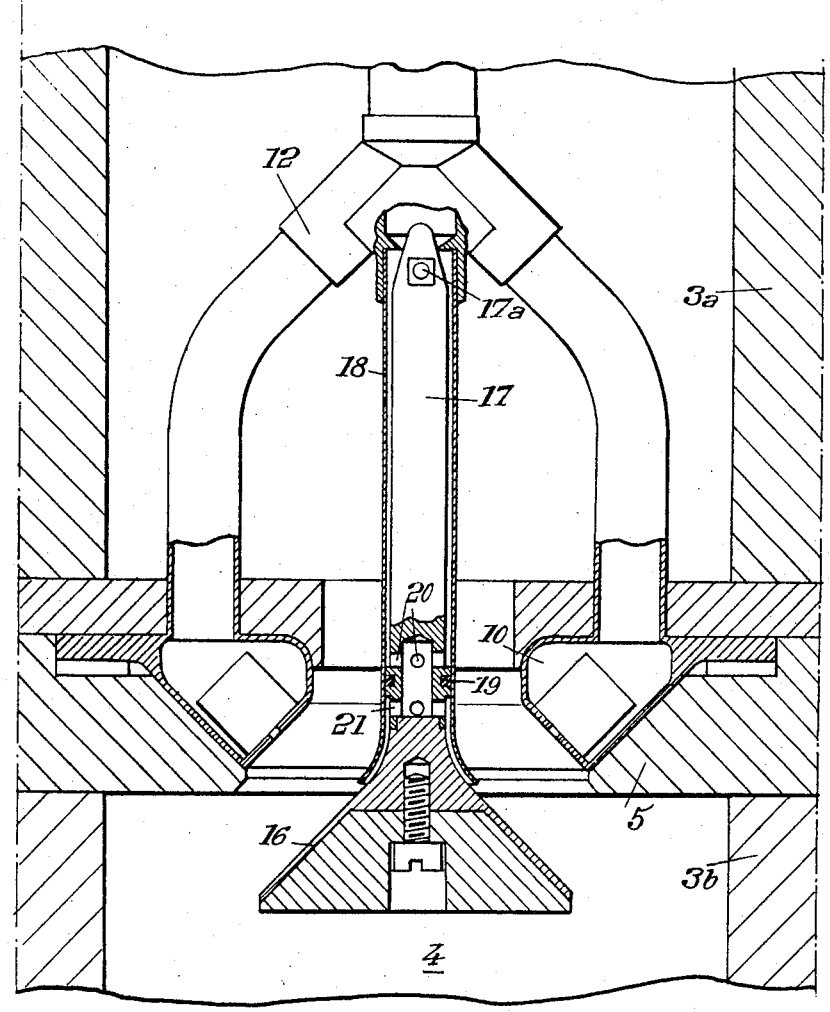

United States Patent Office 3,274,775
Patented Sept. 27, 1966

3,274,775
HOT GAS GENERATORS AND IN PARTICULAR ROCKET MOTORS
Pierre Berton, Boulogne-sur-Seine, France, assignor to Office National d'Etudes et de Recherches Aerospatiales, called O.N.E.R.A., Chatillon-sous-Bagneux, Seine, France, a society of France
Filed July 15, 1963, Ser. No. 294,831
Claims priority, application France, July 18, 1962, 904,385
19 Claims. (Cl. 60—39.47)

The present invention relates to hot gas generators wherein energy is supplied by the reaction with each other of at least two components, to wit a fluid one and a solid one, respectively, the solid component forming a lining along a casing so as to enclose a reaction chamber, and the fluid component being gradually delivered into said chamber. The invention is more especially concerned with hot gas generators acting as rocket motors and more especially with rocket motors where said two components are hypergolic, that is to say react spontaneously with each other without the action of external energy.

The object of the present invention is to provide a hot gas generator of this kind which is better adapted to meet the requirements of practice than those known up to this time.

The invention is concerned with such a generator comprising, for the introduction of the fluid component into the reaction chamber, at least two injector devices disposed at a distance from each other in the axial direction, to wit a first injector device located substantially at the upstream end of the reaction chamber and a second injector device located downstream of the first one. According to the essential feature of the present invention the second injector device is carried by an obstacle, advantageously in the form of a diaphragm, disposed on the path of travel of the stream of the reaction products flowing through said chamber, said diaphragm being capable of producing turbulency in said stream.

Advantageously, said obstacle, which is cooled by the fluid component fed through the second injector device, comprises a feed compartment from which start the injection orifices of the second injector device, said feed compartment preferably also serving to limit the section of flow of the fluids at the level of the obstacle.

Preferred embodiments of the present invention will be hereinafter described with reference to the appended drawings, given merely by way of example, and in which:

FIG. 1 is an axial sectional view of a rocket motor made according to the invention;

FIG. 2 shows on an enlarged scale the liquid component feed means;

FIG. 3 shows a modification of a portion of the structure of FIG. 2;

FIG. 10 is an axial sectional view of a rocket motor made according to still another embodiment of the invention.

Figure 4:
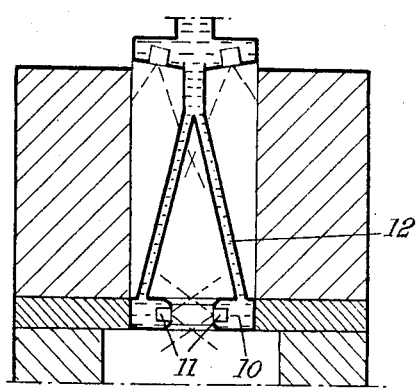
FIGS. 4 and 5 are diagrammatical views, on a smaller scale, of two embodiments of the injection system of FIG. 2.

A rocket motor according to the invention, as shown by FIG. 1, comprises a combustion chamber 1 provided at the rear end thereof with an outlet nozzle 2. The wall of said combustion chamber 1 is provided on the inner face thereof with two different solid components as shown at $3_a$ and $3_b$, said solid components having a hypergolic character with respect to the fluid component fed into chamber 1, and which is for instance nitric acid. Solid component $3_a$ is adapted to ensure combustion in chiefly liquid phase and consists for instance of PTC 9010 (90% of paratoluidine and 10% of polyvinyl chloride with the addition of a plasticizer). Solid component $3_b$ is adapted to ensure combustion in chiefly gaseous phase and consists for instance of PTC 8515 (80% of paratoluidine and 15% of polyvinyl chloride, with the addition of a plasticizer).

The two solid components $3_a$ and $3_b$ form annular linings along the inner wall of chamber 1, thus leaving, along said chamber, a central conduit 4 for the flow of the reaction products.

In this central conduit 4 and preferably in the plane along which components $3_a$ and $3_b$ join each other, there is provided an obstacle consisting of a diaphragm 5 forming a local restriction of the cross section of flow, thus improving combustion.

On the other hand, as shown by FIG. 2, at least two injector devices spaced apart from each other in the axial direction are provided for introduction of the liquid component into central passage 4. The first injector device is located substantially at the upstream end of central conduit 4 and consists for instance of two annular rows of injectors $6_a$ and $6_b$ carried by a plate 7. This plate forms the front end of the combustion chamber and the rear wall of the feed chamber 8 from which injectors $6_a$ and $6_b$ are fed. This feed of liquid component is controlled by a valve 9 to be used for starting or stopping the rocket engine. The second injector device is located downstream of said injector device.

According to the main feature of the present invention this second injector device is carried by diaphragm 5, which is thus cooled by the liquid component fed to said second injector device. Preferably, as shown, the second injector device is arranged in such manner that the liquid component is fed thereto through a feed compartment 10, advantageously of toroidal shape, belonging to diaphragm 5 the cooling of which is thus further improved.

Figure 5:
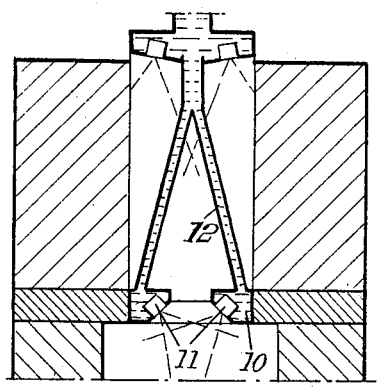

For instance the second injector device may consist of a row of injectors 11 communicating with feed compartment 10 and directed either in the upstream direction (case of FIG. 2), or in the plane of diaphragm 5 (case of FIG. 4), or again in the downstream direction (case of FIG. 5).

According to another feature of the invention, feed compartment 10 is fed with the component stored in the liquid form through at least one conduit located in the upstream portion of central conduit 4, as limited by end plate 7 on the one hand and diaphragm 5 on the other hand.

In this way an efficient cooling of diaphragm 5 is obtained without having to connect said diaphragm with the source of liquid component through one or several conduits located on the outside of combustion chamber 1.

This location of the feed conduit leading to compartment 10 inside the upstream portion of central conduit 4 is made possible by the fact that, during operation, the temperature of this upstream portion is much lower than that of the downstream portion of said conduit 4. Furthermore said feed conduit is cooled by the circulation of the liquid component.

Advantageously, as shown, feed conduit 12 is in the form of a fork having for instance two branches, i.e.

of an inverted Y the stem 12$_a$ of which is secured to plate 7 and the branches of which lead to diametrically opposed portions of feed compartment 10.

It is of course necessary to be able to determine the relative flow rates of fluid component delivered by the first and the second injector devices respectively.

In order to be able to determine the ratio of these two flow rates, it is advantageous to make use of a sleeve 13 provided with suitably calibrated orifices capable of producing a pressure drop in one of the fluid component streams leading respectively to injectors 6 and injectors 11.

According to a first solution, illustrated by FIG. 2, the upstream end of sleeve 13 is in communication with chamber 8 through which injectors 6 are fed and said valve comprises a calibrated passage 13$_a$ producing a pressure drop for the flow of the liquid component toward the forked feed conduit 12.

According to a second solution, illustrated by FIG. 3, sleeve 13 extends through chamber 8 to lead directly to conduit 12 and it is provided with calibrated side orifices 13$_b$. It should be understood that in both cases it suffices to make use of sleeves 13 having suitable calibrated orifices for obtaining a suitable distribution of the fluid component between the first and the second injector devices.

Diaphragm 5 may be made of stainless steel and toroidal feed compartment 10 of steel sheet, consisting of two shells assembled by welding both with each other and with the branches of forked conduit 12.

Figure 6:
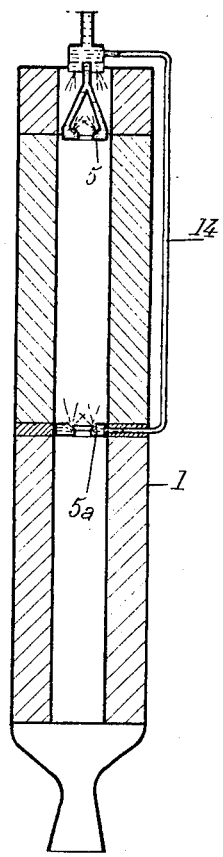
FIG. 6 is a diagrammatic axial sectional view of a rocket motor of the same type as that of FIG. 1 but comprising a third stage of injection of the liquid component.

It should be pointed out that there might be provided, as shown by FIG. 6, one or several other diaphragms, such as 5$_a$, disposed downstream of diaphragm 5 and serving to support other injector devices, such a diaphragm 5$_a$ being advantageously cooled by the flow of the liquid component fed thereto through at least one conduit 14 located on the outside of combustion chamber 1.

Figure 8:
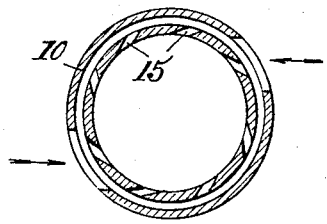
FIG. 8 is a cross sectional view corresponding to FIG. 7.
Figure 9:
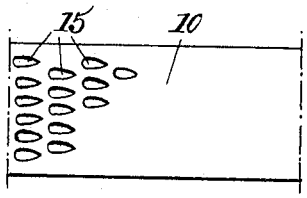
FIG. 9 is a part developed view corresponding to FIGS. 7 and 8.
Figure 7:
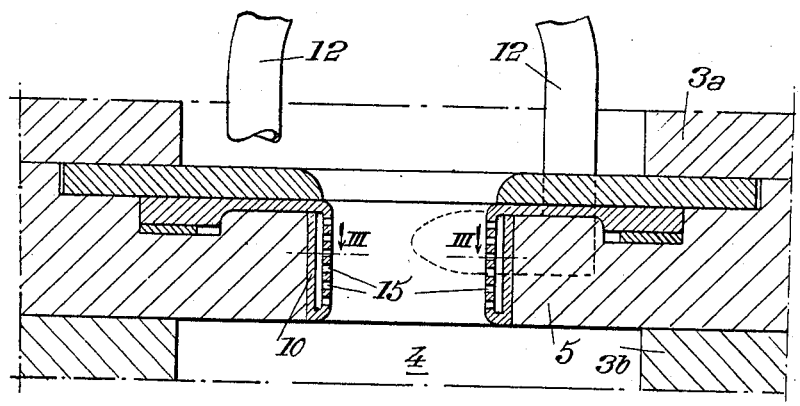
FIG. 7 is a view analogous to a portion of FIG. 2 relating to another embodiment.

It is also possible, according to another embodiment of the invention, illustrated by FIGS. 7 to 9 inclusive, to make use, for distributing into conduit 4 the fluid component arriving through annular feed compartment 10, of at least one row of holes 15 provided directly to the wall of said feed compartment, the axes of said holes making a relatively small angle (of some degrees) with this wall, whereby the jets of fluid component issuing from said holes are given a tangential velocity component and tend to form, on the face of said wall, a film which further improves the cooling thereof according to an arrangement known as "film cooling."

Preferably, several circular rows of orifices 15 are provided, the respective orifices of two successive rows being advantageously staggered, as shown by FIG. 9 which is a partial developed view of the wall of feed compartment 10.

It should be noted that the portion of the wall of feed compartment 10 in which holes 15 are provided, which is shown as being of cylindrical shape on FIG. 7 by way of example might be, at least partly, of frusto-conical shape and turned toward the upstream or the downstream side.

Anyway such an arrangement with inclined holes is of easy manufacture, improves the cooling by "film cooling" effect and permits, due to the fact that feed compartment 10 is free from any internal obstruction, of reducing the transverse cross section thereof in order to accelerate the flow and thus further to improve the cooling.

By way of example, in the embodiment of FIG. 7, the external diameter of component 3$_a$, 3$_b$ is 340 mm., the initial diameter of the central conduit 4 is 120 mm., the diameter of the orifice of the diaphragm (i.e. of the cylindrical passage limited by feed compartment 10) is 40 mm. and the axial length of this passage is 30 mm. In this embodiment seven rows of holes 15 have been provided, every row comprising ten orifices 15. The axes of these orifices are inclined at about 3° with respect to the wall. The width of the annular inner feed compartment 10 is about 3 mm.

According to another feature of the present invention, illustrated by FIG. 10 there is provided, in central conduit 4, immediately downstream of diaphragm 5 a deflector device 16 preferably of conical shape with its apex turned toward the upstream side. This deflector is adapted to deviate toward the layer 3$_b$ of solid component the flow that has passed through diaphragm 5, such a deflection facilitating the consumption of said solid component.

Advantageously, as shown, deflector 16 is carried by an axial rod 17 itself fixed by a pin 17$_a$ to the forked conduit 12.

In order to cool deflector 16, use is made of a circulation of the fluid component. This arrangement is made as follows in the structure illustrated by FIG. 7.

The rod 17 of deflector 16 is surrounded by a tubular sleeve 18 communicating on the upstream side with forked conduit 12.

At least one fluidtight packing ring 19 is provided near the downstream end of said sleeve 18 but at some distance from said end.

Rod 17 is provided with a passage 20 for the flow, upstream of packing ring 19 of the fluid component occupying, upstream of said ring, the annular space between rod 17 and sleeve 18.

Said passage 20 serves to feed a row of orifices 21 opening, downstream of ring 20, into the annular space between rod 17 and the end portion of sleeve 18, said orifices 21 being inclined with respect to the external wall of rod 17 into which they open, in such manner as to impart to the fluid component a rotation which facilitates the formation, on deflector 16, of a continuous film serving to ensure a cooling effect analogous to that obtained by the provision of inclined orifices 15 on the wall of feed compartment 10.

It should be pointed out that FIG. 10 shows a deflecting device used in combination with an injection device making use of individual injectors housed in feed compartment 10. But such a deflecting device might be used with an injection device having mere inclined orifices such as illustrated by FIG. 7.

By way of example, in the case of the construction above referred to, for which numerical dimensions have been indicated, use has been made of a conical deflector having an apex angle of 90° and a diameter at its base of 50 mm., supported by a rod having a diameter of 10 mm. housed in a sleeve 18 having an inner diameter of 12 mm. and an outer diameter of 14 mm., the apex of the deflector cone being located approximately at the level of the downstream edge of the diaphragm orifice.

In a general manner, while the above description discloses what are deemed to be practical and efficient embodiments of the present invention, said invention is not limited thereto as there might be changes made in the arrangement, disposition and form of the parts without departing from the principle of the invention as comprehended within the scope of the appended claims.

What I claim is:

1. A hot gas generator wherein energy is supplied by the reaction with each other of two components, to wit a fluid one and a solid one, respectively, which generator comprises, in combination, a casing, said solid component being disposed in said casing to form therein a reaction chamber for the flow of fluids therethrough, a first injector device for introducing said fluid component into said chamber, means in said chamber downstream of said injector device forming an obstacle across the longitudinal path of travel of fluids through said chamber to produce turbulency in the flow of said fluids and a second injector device opening into said chamber and carried by said obstacle.

2. A hot gas generator wherein energy is supplied by the reaction with each other of two components, to wit a fluid one and a solid one, respectively, which generator comprises, in combination, a casing, said solid component being disposed in said casing to form therein a reaction chamber for the flow of fluids therethrough, a first injector device for introducing said fluid component into said chamber, a transverse annular diaphragm in said chamber downstream of said injector device and a second injector device opening into said chamber and carried by said diaphragm.

3. A hot gas generator wherein energy is supplied by the reaction with each other of two components, to wit a fluid one and a solid one, respectively, which generator comprises, in combination, a casing, said solid component being disposed in said casing to form therein a reaction chamber for the flow of fluids therethrough a first injector device for introducing said fluid component into said chamber, a transverse annular diaphragm in said chamber downstream of said injector device, means in said diaphragm forming a feed compartment, means for feeding said fluid component to said feed compartment and a second injector device opening into said chamber and carried by said diaphragm.

4. A hot gas generator wherein energy is supplied by the reaction with each other of two components, to wit a fluid one and a solid one, respectively, which generator comprises, in combination, a casing, said solid component being disposed in said casing to form therein a reaction chamber for the flow of fluids therethrough, a first injector device for introducing said fluid component into said chamber, a transverse annular diaphragm in said chamber downstream of said injector device, means belonging to the inner edge portion of said diaphragm forming a feed compartment, means for feeding said fluid component to said feed compartment and a second injector device opening into said chamber and carried by said feed compartment.

5. A hot gas generator according to claim 4, said second injector device being directed toward the upstream side of said diaphragm.

6. A hot gas generator according to claim 4, said second injector device being directed in the plane of said diaphragm.

7. A hot gas generator according to claim 4, said second injector device being directed toward the downstream side of said diaphragm.

8. A hot gas generator wherein energy is supplied by the reaction with each other of two components, to wit a fluid one and a solid one, respectively, which generator comprises in combination, a casing, said solid component being disposed in said casing to form therein a reaction chamber for the flow of fluids therethrough, a first injector device for introducing said fluid component into said chamber, a transverse annular diaphragm in said chamber downstream of said injector device, means belonging to the inner edge portion of said diaphragm forming a feed compartment conduit means extending through the portion of said chamber upstream of said diaphargm for feeding said fluid component to said feed compartment, and a second injector device opening into said chamber and carried by said feed compartment.

9. A generator according to claim 8 wherein said feed conduit means is in the form of a forked conduit having two branches.

10. A generator according to claim 1 further comprising means for feeding respective flow rates of fluid component to said first and said second injector devices, respectively.

11. A hot gas generator wherein energy is supplied by the reaction with each other of two components, to wit a fluid one and a solid one, respectively, which generator comprises, in combination, a casing, said solid component being disposed in said casing to form therein a reaction chamber for the flow of fluids therethrough, a first injector device for introducing said fluid component into said chamber, means in said chamber downstream of said injector device forming an obstacle across the longitudinal path of travel of fluids through said chamber to produce turbulency in the flow of said fluids, a second injector device opening into said chamber and carried by said obstacle, means for feeding said fluid component at respective flow rates to said first and said second injector devices, respectively, said means comprising a sleeve having one end thereof fed with said fluid component, said sleeve being in free communication with one of said injector devices and being provided with holes in communication with the other of said injector devices.

12. A generator according to claim 11 wherein said sleeve comprises a calibrated passage producing a pressure drop in the flow of said fluid component to the second injector device.

13. A generator according to claim 11 wherein said sleeve comprises a calibrated passage producing a pressure drop in the flow of said fluid component to the first injector device.

14. A generator according to claim 1, further comprising at least one second obstacle located downwardly of said first obstacle in said reaction chamber, and means extending on the outside of said casing for feeding said fluid component to said reaction chamber through said second obstacle.

15. A hot gas generator wherein energy is supplied by the reaction with each other of two components, to wit a fluid one and a solid one, respectively, which generator comprises, in combination, a casing, said solid component being disposed in said casing to form therein a reaction chamber for the flow of fluids therethrough, a first injector device for introducing said fluid component into said chamber, a transverse annular diaphragm in said chamber downstream of said injector device, means belonging to the inner edge portion of said diaphragm forming a feed compartment, means for feeding said fluid component to said feed compartment, the inner wall of said feed compartment, which belongs to the inner edge portion of said diaphragm, being provided with injection holes the respective axes of which make a small angle with said inner wall.

16. A generator according to claim 15 wherein several rows of injection holes are provided.

17. A generator according to claim 16 wherein said holes are staggered from one row to the next one.

18. A generator according to claim 1 which further comprises in said reaction chamber, immediately downstream of said obstacle, a deflector device, capable of deflecting the stream of fluids through said reaction chamber toward the solid component forming the wall thereof.

19. A generator according to claim 17 further comprising, to cool said deflector device, means for forming thereon a continuous film of said fluid component.

References Cited by the Examiner

UNITED STATES PATENTS

| 3,127,739 | 4/1964 | Miller | 60—35.6 |
| 3,166,898 | 1/1965 | Hoeptner | 60—35.6 |
| 3,173,251 | 3/1965 | Allen et al. | 60—35.6 |

MARK NEWMAN, *Primary Examiner.*

C. R. CROYLE, *Assistant Examiner.*